March 29, 1966   D. J. ROSENBERG   3,242,527
OVEN FOR CURLING RESIN IMPREGNATED FIBROUS MAT Filed Aug. 19, 1964   4 Sheets-Sheet 1

INVENTOR.
David J. Rosenberg
BY
ATTORNEYS

INVENTOR.
David J. Rosenberg
BY
ATTORNEYS

March 29, 1966     D. J. ROSENBERG     3,242,527
OVEN FOR CURLING RESIN IMPREGNATED FIBROUS MAT
Filed Aug. 19, 1964     4 Sheets-Sheet 3

March 29, 1966 D. J. ROSENBERG 3,242,527
OVEN FOR CURLING RESIN IMPREGNATED FIBROUS MAT
Filed Aug. 19, 1964 4 Sheets-Sheet 4

INVENTOR
David J. Rosenberg
BY
ATTORNEYS

3,242,527
OVEN FOR CURLING RESIN IMPREGNATED FIBROUS MAT

David J. Rosenberg, Mountaintop, Pa., assignor to Certain-Teed Fiber Glass Corporation, Ardmore, Pa., a corporation of Maryland
Filed Aug. 19, 1964, Ser. No. 390,655
4 Claims. (Cl. 18—4)

This invention relates to the production of resin impregnated fibrous material and more particularly to a method and apparatus for shaping and curing glass fiber mats, for example of the type used as insulation in the walls of buildings.

The principal objective of the invention is to reduce the cost of production of fiber mats such as the insulation above referred to. How this objective is achieved is explained herebelow following brief reference to the general technique employed in the manufacture of such materials.

In the production of glass fiber mat such as is commonly used for acoustic or thermal insulation, the fibers from which the mat is formed are sprayed with a resin binder of the thermosetting type so that when a blanket of these fibers is compressed a predetermined amount and cured, it will have sufficient strength and will retain a desired shape and density. For this purpose the blanket is either first compressed and later conveyed to a curing oven, cut into pieces which are each cured under pressure in heated presses, or the blanket is passed between the facing surfaces of a pair of conveyor belts which shape the material and cure it while continously advancing it through a curing oven. The latter approach is preferable since it results in large production increases. Moreover, it does not mark the product with the characteristic press marks produced by stationary presses and it also results in a product of much more uniform density than is the case with products which are cured when not under compression.

In spite of these advantages a number of drawbacks exist in conveyors and ovens of the type mentioned. Problems arise because the conveyor belts used to shape and advance the material should be porous in order to permit the free flow of the hot curing gases through the felted fibrous mat, and yet they must present a smooth, planar surface. In certain prior efforts to accomplish the foregoing, conveyor structures have been employed in which rigid elements spanning the width of the conveyor are provided, such elements being guided at the edges in order to prevent undesired sagging. With such structures, however, it is difficult to provide a conveyor surface having a high percentage of apertures therethrough for the passage of the heating gases. As a result, for a given heat curing effect it is necessary to greatly extend the length of the conveyor and also of the associated oven.

In contrast to such prior techniques, the present invention contemplates employing a conveyor formed of woven wire mesh or screening and thereby provides a conveyor surface having a very high percentage of apertures providing gas flow area.

Heretofore it has not been practicable to employ such a woven wire mesh conveyor belt because of the flexibility and pronounced tendency for such a belt to sag and bow. Such sagging and bowing has heretofore tended to occur in spite of various efforts to eliminate it. For instance, spring loaded tensioning devices have been used but even these will not completely eliminate this sagging problem and tend to stretch the belt so that readjustment of the tension is frequently necessary. Moreover when these flexible belts are placed under a great deal of tension the sides may tend to bow. Coning of the drive rollers, which is desirable in order to keep the conveyor belt properly tracking, also tends to aggravate this problem of transverse bowing. While the problem can be coped with in the upper run of the lower conveyor by rolls or other guide structure arranged below the upper run of the lower conveyor, the sag and bow is especially difficult to control in the lower run of the upper conveyor because supports cannot be positioned beneath that run. As a result, it is extremely difficult to effect uniform compression of the material within the curing oven.

With the foregoing in mind, the invention provides a solution of various of the problems above referred to by combining the use of a wire mesh belt with a novel form of guide structure for the lower run of the upper conveyor which not only overcomes the tendency to sag and bow but which also avoids any appreciable restriction of the gas flow area through the belt. Specifically, this object of the invention is achieved by providing magnetic guide structure for the lower run of the upper conveyor belt. In the preferred embodiment the magnetic guide structure comprises magnetic rolls positioned above the lower run of the upper conveyor belt, thereby restraining the belt as against sagging under the action of gravity. Since the rolls have substantially only a line contact with the woven mesh of the belt, the gas flow area through the belt is not appreciably impaired.

In applicant's arrangement, by the combined use of the woven mesh belt and the magnetic rollers it becomes practicable to supply adequate heat to cure the binder resin in the mats being formed with a much shorter run of the conveyors and also with a shorter length of heating oven, and this effects a saving not only in equipment cost but also in operating cost.

Other objects of the invention include the provision of improved oven structure associated with the wire mesh conveyor belts, and providing for the passage through the conveyor belts and through the material being treated of a high volume of heating gases within a length of conveyor structure considerably shorter than has been practicable heretofore.

Various other objects and advantages of the invention include the provision of means providing for more uniform cure of the resin impregnated fibrous mat being handled by the equipment, and the provision of particularly effective means for adjusting the conveyor spacing and thereby the degree of compression and the thickness of the mat being prepared.

How the foregoing and other objects of this invention are achieved will become more apparent from the following description and the accompanying drawings in which.

Figure 1:
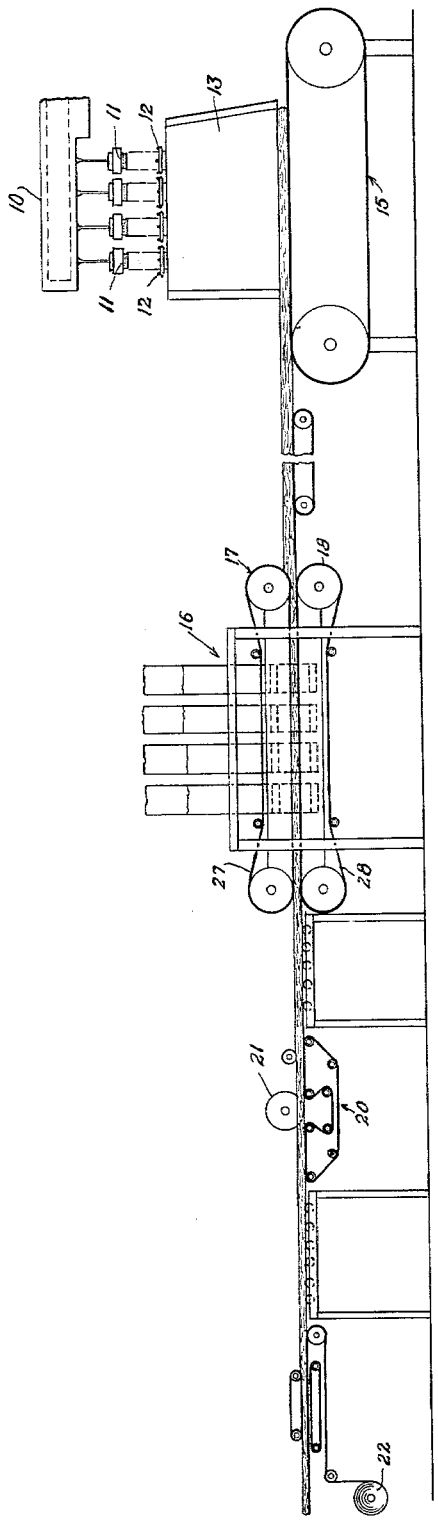
FIGURE 1 is a diagrammatic view of a glass fiber blanket forming apparatus in which the improved oven of the present invention is employed.

In forming glass fiber mat of the type cured and shaped by the apparatus of the present invention, molten glass in the forehearth 10 of a furnace is fed to spinners 11 provided with rows of holes through which finely divided streams of molten glass flow by centrifugal force. The glass streams are centrifuged into attenuating blasts coming from combustion chambers surrounding each spinner and the hot gaseous blasts attenuate the glass into fine fibers. Resin binder nozzles 12 are spaced below the zone of fiber attenuation so that the fibers are coated with a fine spray of thermosetting binder. The fibers pass within the confining walls of a forming hood 13 overlying a collecting conveyor 15. A mass or blanket of fibers accumulates on conveyor 15 which is driven at a predetermined rate depending upon the desired thickness of the blanket. This blanket is conveyed to the curing oven 16 where it is engaged by and sized in a treatment zone between the opposing belt faces of continuous conveyors 17 and 18. These conveyors advance the fibrous blanket through a curing chamber within the oven and then to a cutting station 20 where rotary cutters 21 trim the mat to the desired shape, for example several strips about 16 inches wide in the case of a typical household insulation material. The mat may be covered with paper backing applied from roll 22, and is then rolled and ready for shipment.

Figure 2:
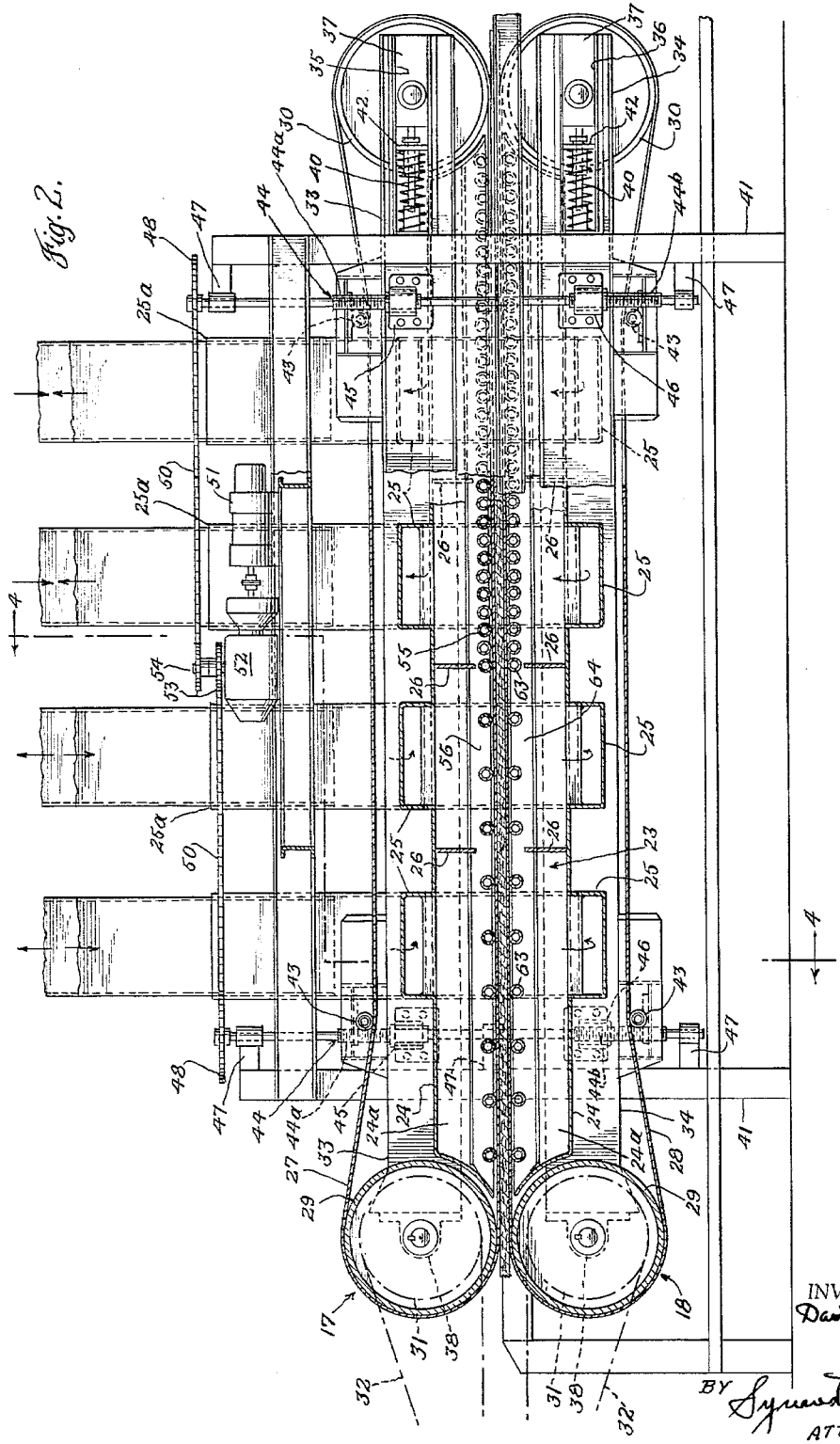
FIGURE 2 is a sectional elevation taken centrally of the oven.
Figure 3:
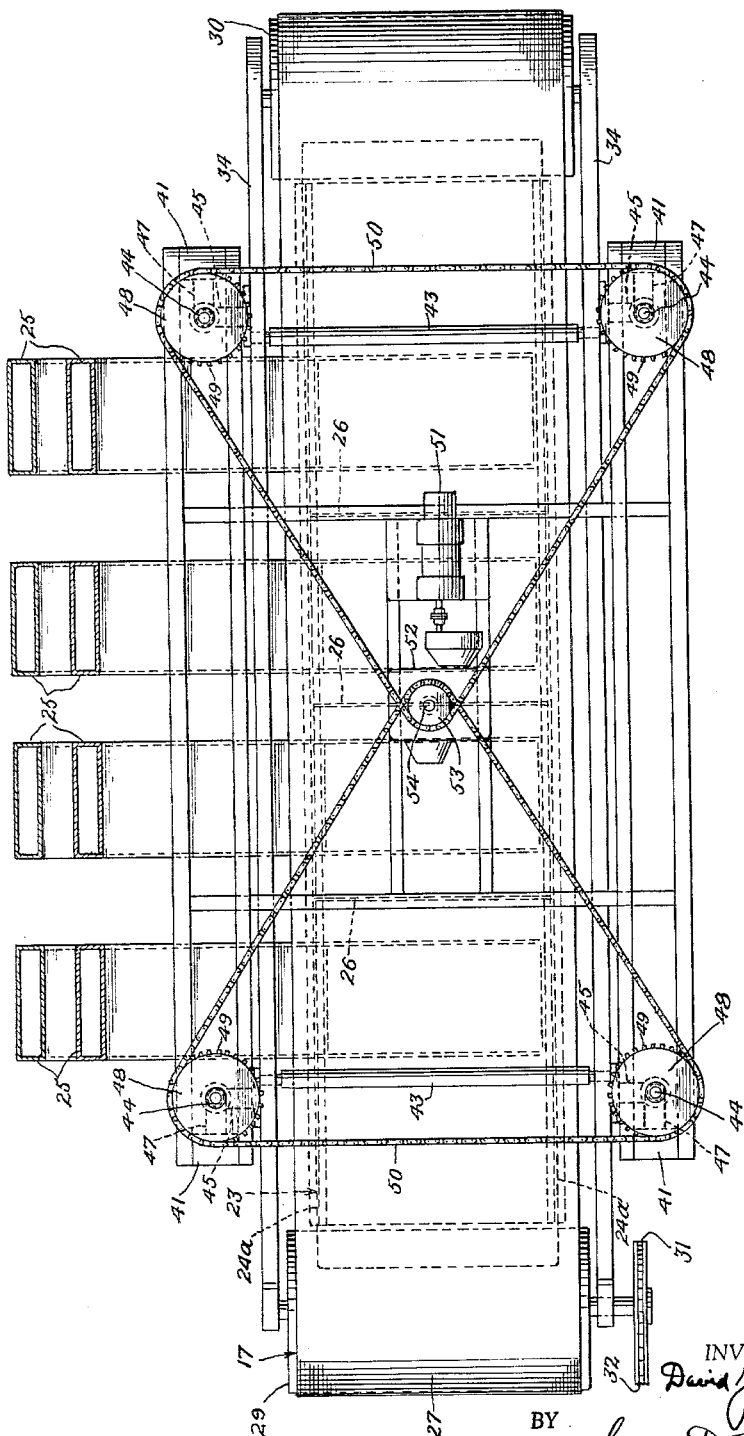
FIGURE 3 is a plan view of the apparatus shown in FIGURE 2.
Figure 4:
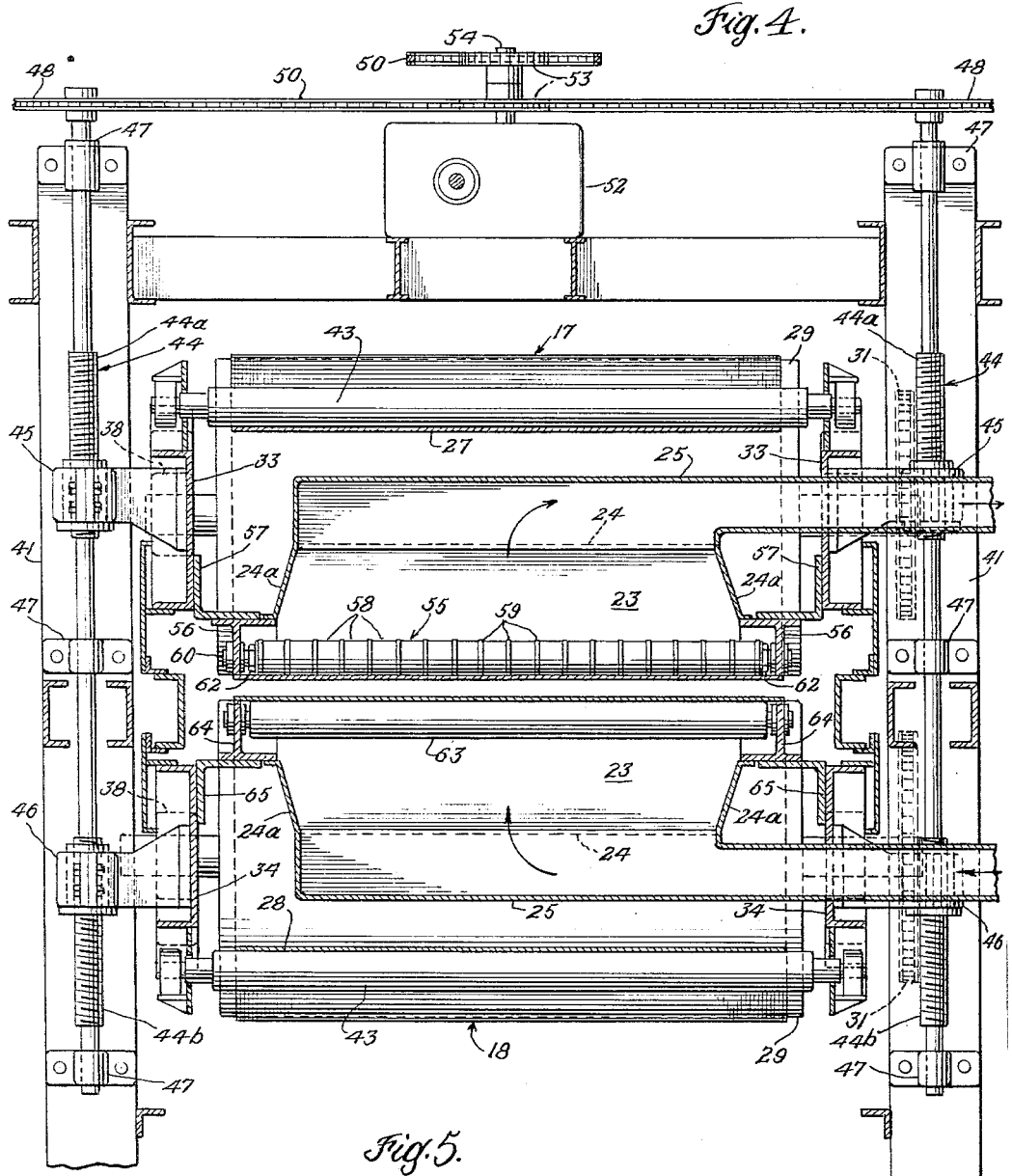
FIGURE 4 is a cross section taken approximately on the line 4—4 on FIGURE 2.

Turning now to the curing oven, in the illustrative embodiment best shown in FIGURES 2–4, this oven includes a curing chamber 23 having upper and lower walls 24, side walls 24a and further including pairs of inlet (or pressure) and outlet (or suction) ducts 25 so that the hot gases are freely circulated throughout the mat. Partitions 26 are located within the oven between adjacent pairs of ducts so that the circulation of gases takes place through the blanket rather than short circuiting from one duct to the next. In the preferred form of the invention the inlet ducts of the two pairs of ducts near the entrance to the oven are located beneath the mat treatment zone and the inlet ducts of those at the exit end are located above this zone. While it would also be possible to alternate the inlet ducts above and below the treatment zone we prefer the arrangement shown since I have found that it offers excellent circulation of hot gases and provides for a very uniform and thorough cure of the mat.

Conveyors 17 and 18 are provided with endless conveyor belts 27 and 28, preferably formed of wire mesh or other similar porous flexible material, these belts being illustrated diagrammatically in the drawings. While any heat resistant material could be used for the lower conveyor belt, provided it had the necessary porosity to permit the hot gases to come into engagement with the binder impregnated fibers, the upper belt is constructed of a magnetic material for reasons which will appear presently.

The conveyor belts 27 and 28 extend outside of the curing chamber 23 and each track on drums or rollers 29 and 30. Drums 29 are driven by a drive mechanism including sprocket wheels 31, one of which is also shown in FIGURE 3, and chain drives 32.

Upper and lower conveyors 27 and 28 are each independently mounted on channel-like frame members 33 and 34 respectively shown in FIGURE 2. Channel-like frame members 33 and 34 are equipped with track-like grooves 35 and 36 at the entrance end of the conveyor and bearing blocks 37 are slidably mounted in these grooves. Rollers 30 are journalled in these blocks. Rollers 29 are journalled in suitable bearings 38 mounted on the opposite ends of the channel frames 33 and 34. Spring loaded tensioning devices including coil springs 40 tend to stretch the conveyor belts lengthwise. One end of each spring 40 bears against the upright frame support 41 of the apparatus and the opposite end bears against an adjustable plate 42 mounted on the bearing blocks 37. Rollers 43 engage the upper run of upper conveyor element 27 and the lower run of lower conveyor element 28 at spaced intervals.

To adjust the thickness and compressive force with which the fibrous mat is shaped, the conveyor frames are each mounted on four spaced jackscrews 44 (FIGURES 2 and 4) having right hand threads 44a and left hand threads 44b which interengage with mating threaded nuts in extensions 45 and 46 secured to the upper and lower frame members respectively. As more clearly shown in FIGURE 4, these jackscrews are mounted in suitable bearings 47 secured to the frame members 41. A sprocket wheel 48 is secured to the top of each jackscrew as best shown in plan view in FIGURE 3. Sprocket wheels 48 have teeth 49 which interengage with the rollers on a conventional drive chain 50. Sprockets 48 are driven by a motor 51 to rotate the jackscrews 44 by means of a drive transmission 52 and two drive sprockets 53 mounted on the output shaft 54 of transmission 52. Operation of the motor causes jackscrews 44 to rotate in unison and the threads 44a and 44b cause the conveyors to move toward and away from a median feed plane to adjust for differing blanket thickness. In practice, the belts may be made capable of as much as twelve to fifteen inches of movement which provides not only for adjustment of blanket thickness but which also facilitates cleaning of the assembly.

It should be noted that the inlet and outlet ducts 25 (FIGURES 2 and 4) pass through openings in the upper and lower conveyor frames 33 and 34, and in order to allow for this movement I prefer to provide telescoping sections 25a. Thus, the ducts have a sufficient flexibility to accommodate this movement.

In order to properly guide the mat engaging run of upper conveyor belt 27 the invention provides for magnetic guide means and while these guide means could take the form of magnetic skids or even magnetized elements on the conveyor itself, I prefer a series of spaced rollers 55 as shown in FIGURE 2. The employment of rollers is simple, offers little interference to gas flow and does not complicate the conveyor structure. These rollers are preferably each formed of permanently magnetized cylindrical sections and as shown in FIGURE 4, they are mounted for rotation in T shaped support members 56 which are secured to angles 57 mounted on the frame members 33. The magnetic field produced by the rollers causes the magnetic conveyor belt to be pulled against them, thereby causing the belt to follow a planar surface for engaging the blanket. The rollers could be variously shaped lengthwise thereof to produce molded mat with a corresponding cross sectional shape although as a practical matter mat having flat surfaces is usually desired.

It has been found that it is possible to space the rollers farther apart at the exit end of the curing chamber since the mat is fairly well cured at that point and so will not be pressed out of shape even if the conveyor belt sags between the rollers. Moreover, in the preferred embodiment alternate rollers are magnetic. While the intermediate non-magnetic rollers could be eliminated I prefer to use them as a backing surface for the lower run of the upper belt to help to produce a smoother product.

Figure 5:
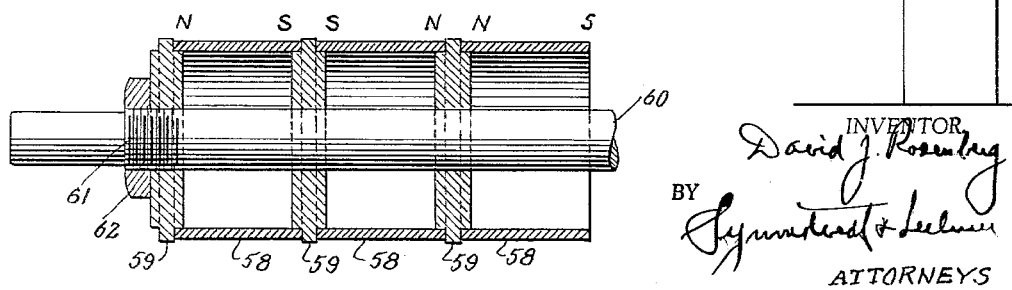
FIGURE 5 is an enlarged section of a magnetic roll, used in the oven of the present invention.

A preferred form of magnetic roller structure is shown in FIGURE 5. Each roller comprises a series of permanent cylindrical magnets 58. Each magnet is supported on guide rings 59 which have grooved edges to maintain the magnets in position. The rings in turn are mounted on support shafts 60, which are provided with threads 61 adjacent their ends which receive nuts 62 to maintain the structure on the shaft as is shown for one end of a roller shaft in FIGURE 5. The use of a plurality of magnetic rollers each having a series of separate magnets assembled as illustrated provides a multiplicity of relatively closely spaced zones (both lengthwise and transversely of the conveyor) in which the conveyor belt is magnetically supported.

To support or guide the upper run of the lower conveyor 28 suitable supporting structure such as rollers 63 are provided (see FIGURE 2). These rollers are conventional rollers formed for example of hardened steel, and are journalled in suitable supports 64 mounted on angles 65 (see FIGURE 4). They may also be more widely spaced toward the exit end of the curing chamber, for the same reasons as with the rollers for the upper conveyor.

The oven described above is very effective for the production of resin impregnated fibrous glass mats. It is simple in construction, dependable and produces mat of uniform thickness and density. The novel guide means of the invention are virtually maintenance free and require no adjustment to compensate for changes in belt tension.

The arrangement of the invention, particularly as a result of making possible the effective use of belts having a high percentage of the area thereof represented by apertures for flow of heating gases, enables the heat curing of fibrous mat in a much shorter conveyor run than has been practicable heretofore. Although the magnetic belt guiding means of the present invention is advantageously used with any flexible belt, the advantages of the invention are achieved to the full when the use of the magnetic guides is combined with belts of the wire mesh type.

This invention enables mat production with equipment representing a considerably smaller investment than heretofore possible, particularly because both the length of the conveyors and the length of the oven may be very substantially shortened as compared with prior practice. This represents a saving not only in the initial cost of equipment, but also in the operating costs in production of cured mat, for the reason that it reduces the total amount of oven and conveyor parts which must be raised to and maintained at elevated temperatures.

I claim:

1. In equipment for the manufacture of a uniform thickness blanket of fibrous insulating material sufficiently pervious to allow passage therethrough of a treatment gas, the combination of an oven having a passage of uniform height defined by a pair of conveyor belts having runs arranged one above the other and cooperating to advance a binder impregnated fibrous blanket through the oven, the upper conveyor belt being formed of a foraminous magnetic material having a tendency to sag, means for circulating a treatment gas through the blanket as it is conveyed through the oven to effect setting of the binder, and magnetic supports above said run of the upper conveyor and distributed transversely of the motion of the conveyor belt in the region of the circulating means to provide support for the upper conveyor in the region where the binder is being set by the treatment gas.

2. The combination according to claim 1 in which the magnetic supports include a plurality of magnetic elements positioned in a series with like poles facing each other.

3. In an apparatus for the manufacture of a binder impregnated fibrous blanket, the combination comprising an oven having a treatment chamber for curing said binder, a continuous conveyor belt having upper and lower runs, the lower run being engageable with the blanket for advancing the blanket through the treatment chamber, the belt being formed of magnetic material having a tendency to sag, and magnetic support means positioned above the lower run of the conveyor belt for preventing sagging thereof, the magnetic support means including a plurality of magnet elements with adjacent elements having like poles facing each other.

4. An oven for simultaneously curing and shaping into uniform thickness a blanket of fibrous insulating material sufficiently pervious to allow passage therethrough of a heating gas, the oven comprising upper and lower endless conveyor belts having lower and upper runs, respectively, providing a passage of uniform height for advancing a binder impregnated fibrous blanket through the oven, a heating gas supply chamber located between the upper and lower runs of one of the conveyors, a heating gas discharge chamber located between the upper and lower runs of the other conveyor, the chambers cooperating to effect flow of heating gas through the blanket of binder impregnated fibrous material as it is advanced through the oven, the upper conveyor belt being formed of magnetic metal mesh having a tendency to sag, and supports for the lower run of the upper conveyor and for the upper run of the lower conveyor providing for maintaining the runs in planes parallel to each other, the support for the lower run of the upper conveyor being positioned above that run in the region of the gas chambers and including a plurality of axially supported and aligned magnetized elements extended transversely of the motion of the conveyor belt with adjacent elements having like poles facing each other.

References Cited by the Examiner

UNITED STATES PATENTS

| 1,953,704 | 4/1934 | Erdmann. | |
| 2,698,260 | 12/1958 | Neauze. | |
| 2,912,738 | 11/1959 | Bergling et al. | 18—4 XR |
| 2,975,470 | 3/1961 | Shelson et al. | 18—4 |
| 2,998,501 | 8/1961 | Edberg et al. | 18—4 XR |
| 3,169,632 | 2/1965 | Kain | 198—202 XR |
| 3,179,240 | 4/1965 | Kain | 198—202 |

FOREIGN PATENTS 691,543  7/1964  Canada.

WILLIAM J. STEPHENSON, *Primary Examiner.*